No. 747,636. PATENTED DEC. 22, 1903.
M. F. POWERS.
HANDLE SECURING DEVICE FOR HAMMERS OR OTHER TOOLS.
APPLICATION FILED FEB. 7, 1902.
NO MODEL. 2 SHEETS—SHEET 1.
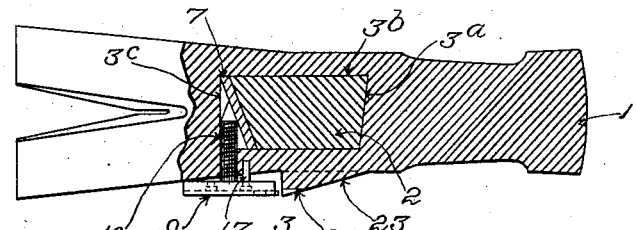
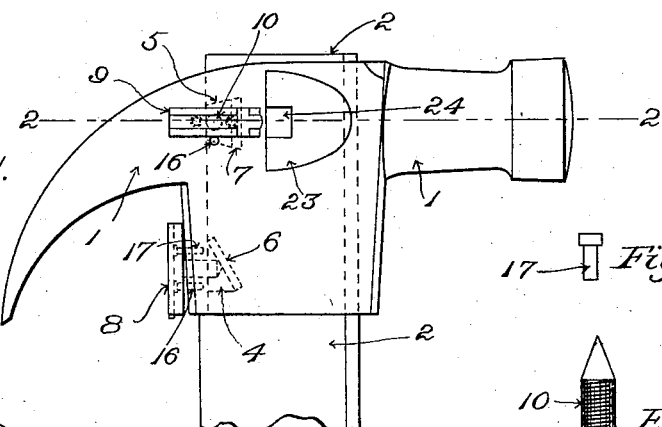
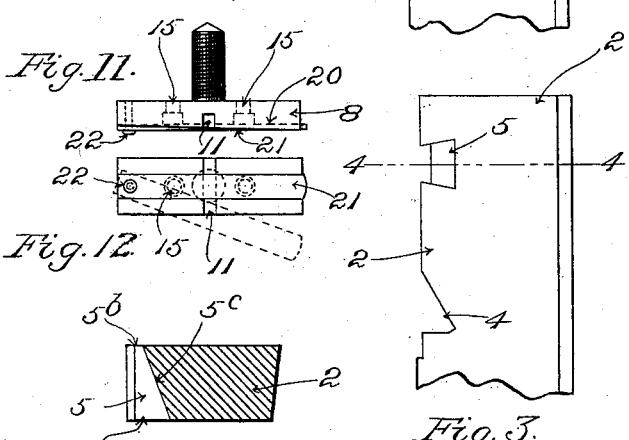
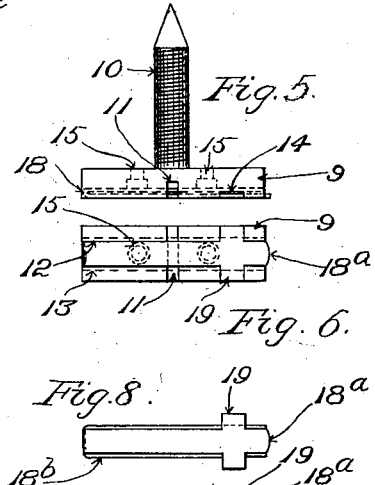
Witnesses:
Oscar F. Hill
Robert Wallace
Inventor:
Milton F. Powers,
by Macleod Calver & Randall,
Attorneys.

No. 747,636. PATENTED DEC. 22, 1903.
M. F. POWERS.
HANDLE SECURING DEVICE FOR HAMMERS OR OTHER TOOLS.
APPLICATION FILED FEB. 7, 1902.
NO MODEL. 2 SHEETS—SHEET 2.
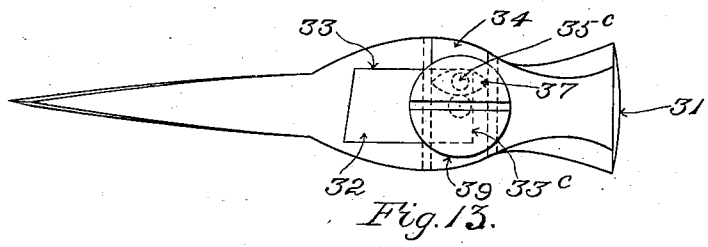
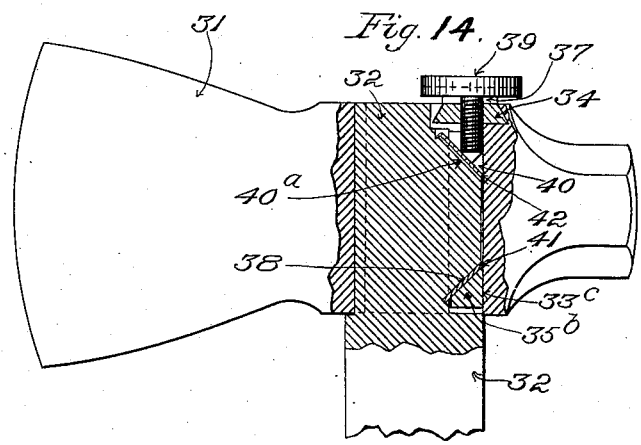
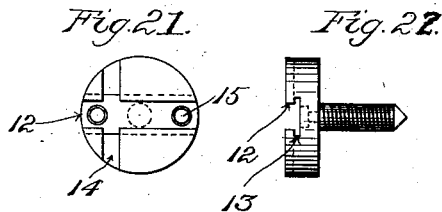
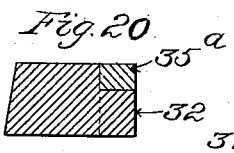
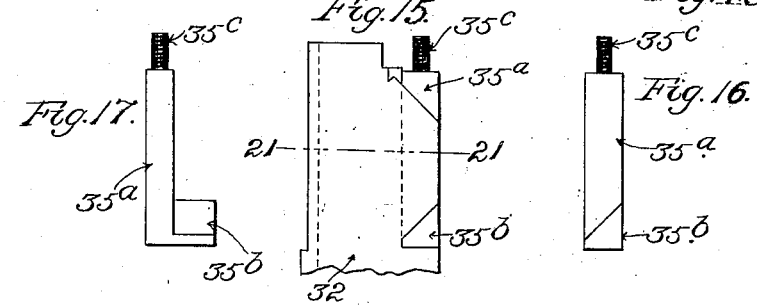
Witnesses:
Oscar F. Hill
Robert Wallace.
Inventor:
Milton F. Powers
by Macleod Calver & Randall,
Attorneys.

No. 747,636.

Patented December 22, 1903.

UNITED STATES PATENT OFFICE.

MILTON F. POWERS, OF WINCHESTER, MASSACHUSETTS.

HANDLE-SECURING DEVICE FOR HAMMERS OR OTHER TOOLS.

SPECIFICATION forming part of Letters Patent No. 747,636, dated December 22, 1903.

Application filed February 7, 1902. Serial No. 93,000. (No model.)

*To all whom it may concern:*

Be it known that I, MILTON F. POWERS, a citizen of the United States, residing at Winchester, in the county of Middlesex, State of Massachusetts, have invented a certain new and useful Improvement in Handle-Securing Devices for Hammers or other Tools, of which the following is a specification, reference being had therein to the accompanying draw10 ings.

My invention is designed to provide an improved method of attaching the heads of tools—such as hammers, hatchets, mallets, axes, adzes, and the like—to the handles or helves by which they are manipulated.

The common method of connecting the usually metal heads of the tools with the preferably wooden handles consists, as is well known, in forming the eye or socket of the tool into which the handle is introduced of a tapering form having the minimum area at the side from which the handle is introduced. After the handle enters the eye to the desired extent its withdrawal therefrom is pre25 vented by wedges, which are driven into the part of the handle contained in the socket and split and expand the same, so as to completely fill the portion of the eye having the maximum area. While this method of secur30 ing the handle in its place is temporarily effective, it is open to several objections. The drying or further seasoning of the wood of which the handle is made often tends to cause the securing-wedge to loosen or drop out, necessitating the putting in more wedges, and thus splitting up the end of the handle until its strength is seriously impaired, or, to say the least, its appearance is much disfigured. A more serious objection arises under the old method of securing the handles when the handle becomes broken or when it is desired to withdraw the one already in place from the eye of the head. In such case the taper of the said eye makes it impossible forcibly to drive the handle from the position in which it is secured, and in most cases it is necessary to bore or drill away the wooden fragment filling the eye in order to make it possible to insert a new handle.

The above-mentioned objections are the cause of much annoyance and considerable expense, and my invention is designed to overcome the same by providing a means of attaching the head to the handle which will be effective and simple, but yet one which will permit the handle to be readily tightened into its place when it becomes loosened or to be readily loosened, so that it may be easily withdrawn from the eye when it is desired to substitute another handle therefor.

To effect the result I desire to attain, I cause the handle to be secured in the head by providing adjustable screws or wedges, which press the former against the interior surface of the socket or eye of the latter with such force as to insure a firm frictional contact between the same sufficient to hold the handle fixedly in its position. The means I adopt to secure this desired result I will proceed to describe with reference to the drawings, in which—

Figure 1 shows in side elevation the head of an ordinary claw-hammer embodying my invention in its simplest form. Fig. 2 shows a plan view of the same, partly in section. Fig. 3 shows the end of a handle ready for fastening into position. Fig. 4 is a section of the same on the line 4 4. Figs. 5, 6, and 7 show one form of securing-screws of which I make use, respectively in side elevation, in plan, and in end view. Figs. 8 and 9 show plan and side views of the retaining device for the pins with which I lock the securing-screws. Fig. 10 shows a pin used in locking the said securing-screw. Figs. 11 and 12 show a modified form of securing-screw with its pin-retaining cover. Figs. 13 to 22 show a modified form of my invention, which, as illustrated, is shown in use in securing a hatchet or similar tool head to its handle. Fig. 13 is a plan view, and Fig. 14 is a side elevation, of a hatchet in which is embodied the form of my invention. Fig. 15 presents the handle end ready for insertion in the head-eye, with the wedging device in position. Figs. 16 and 17 show the lower adjusting or wedging device alone in side and front elevation, respectively. Figs. 18 and 19 show plan and side views of the nut used in connection with the said wedging device. Fig. 20 shows a section of the handle end on the line 21 21. Figs. 21 and 22 illustrate the details of the securing-screw used.

In the illustrations of the simplest form of my invention, (shown in Figs. 1 to 9,) 1 is the head of an ordinary claw-hammer, and 2 is the end of the handle to which it is to be secured. The eye 3 of the hammer 1 is preferably of substantially rectangular form, but differs from a true rectangle in having one end thereof, as 3$^a$, preferably that nearer the effective portion of the said tool, inclined to the sides of the said eye, as shown in Fig. 2. The eye is of uniform size throughout—that is, it is not tapered in its length. The axis of the eye may be perpendicular to the tool-head or it may be given any desired inclination in the same in order to obtain the "pitch" or "hang" of the tool-head wished for.

The portion of the handle 2, which is to be introduced within the eye of the head, is shaped to correspond therewith and is of a size to readily slip into the same, forming a snug fit. On the end most remote from the inclined side of the handle are cut two notches 4 and 5. The upper of these, 5, has a slanting surface, being cut deeper on one side, as at 5$^a$, than on the other, 5$^b$, as will appear in Fig. 4. The lower notch is also a recess in the side of handle, and its general character appears in Figs. 1 and 3, where it is shown with an inclined bottom surface, which results from the fact that it is deeper at the lower end of the notch than at the upper end of the same. When the notches have been cut, preferably metal strips 6 and 7 are employed, which are fitted onto their inclined surfaces.

When the handle has been made ready in the manner above stated, it is introduced into the eye of the tool. It is then secured in place by the securing-screws 8 and 9, which when screwed inwardly act, in a manner presently to be shown, to crowd the handle forward into the corner formed by the side 3$^b$ and the inclined end 3$^a$ of the eye with sufficient force to make a rigid connection between the same and the tool-head. The lower securing-screw 8 is fitted to a similarly-tapped hole in the lower part of the rear or uninclined side 3$^c$ of the eye and is directly opposite the notch 4 in the handle end. By screwing the same so as to cause its end to bear against the bottom of the said notch the requisite pressure necessary to secure the handle in place can be easily produced. Furthermore, the inclination of the bottom of the notch 4 will serve to prevent the head of the tool flying off from the handle, even though the same may be considerably loosened therein. The upper securing-screw 9 is located in the upper part of the side of the hammer-head, and the threads thereof should preferably bear somewhat against the side 3$^c$ of the said eye, as at 10, to give the same lateral support when it is desired to utilize the wedging effect of its point in a manner that will later appear. The point of the securing-screw should also preferably be somewhat tapered, and the said screw should be so positioned as to be opposite the upper notch 5 in the handle. By screwing in the screw 9 the effect is to cause its tapered point to bear against the metal strip 7 on the surface of the recess 5, causing the handle 2 to be forced by the wedging action so created into the corner formed by the inclined side 3$^a$ and the adjacent side 3$^b$. By the simultaneous action of both screws 8 and 9 the degree of force with which the handle end is thus secured in place is quite sufficient to insure the required rigidity of the connection between the handle and the tool-head, and if any loosening occurs in the course of use it may be easily corrected by farther screwing in of the securing-screws or by supplying new metal strips or shims 6 and 7 under the ends of the screws of sufficient thickness to give the necessary firmness of contact.

The securing-screws may be of any desired form; but the heads thereof should preferably be of such a shape as to allow the adjustment of the same by the hand, thereby obviating the necessity for the use of wrenches for this purpose. It is furthermore advisable to provide a means of locking the said securing-screws in the desired adjustment, so as to prevent the same from working loose in use. I have therefore invented a securing-screw having a head of sufficient dimensions to allow of a manual operation of the same and also provided with a device for locking the same in the desired position. The heads are preferably of the shape and proportions shown in Figs. 5, 6, and 7, the length being sufficient to give the leverage required to adjust by hand the same in securing the handle. However, a slot 11 is also provided in the screw in order that the same may be set up into place by a screw-driver, if desired. The upper part of the said head is longitudinally grooved, as at 12, the bottom thereof being undercut, as at 13, Fig. 7, or otherwise made of a greater width than the top thereof. Toward one end of the longitudinal groove it is intersected by a similar groove 14, crossing the former, so as to cause the groovings to present a cruciform appearance. At two points located in the bottom of the longitudinal groove equally distant from the center of the screw holes 15 are drilled through the screw-head. Holes 16 of substantially equal size are also drilled in the metal around the tapped holes in which the securing-screws 8 and 9 turn, the number of the said holes depending upon the number of positions in which it is desired to be able to lock the securing-screw. The radial distance from the axes of the securing-screws at which the holes 15 and 16 are drilled are the same as those in the head of the securing-screw, so that the holes 15 in the screw-head and those 16 in the metal around the screw-hole will successively coincide as the screw is turned. When the desired position is reached, a pin 17 may be inserted into the recess formed by the superposition of a hole 15 in the screw-head over a corresponding hole 16 in the tool-head and the further turning of the said screw will be thereby prevented. The pin 17 should be provided with a head, as shown in Fig. 10, or is otherwise so shaped as to prevent the same from entering too deeply the holes provided for the same.

To hold the pin 17 in place and to prevent the dropping out or loss of the same, I provide a retaining-cover 18 for use with the head of the securing-screw. In its simplest form the said cover consists of a strip of thin preferably spring metal bent double upon itself as that the upper half $18^a$ thereof overlaps the lower $18^b$. As so constructed, the upper half $18^a$ is made with the projections 19, giving the said retaining-cover a cruciform shape, fitting the recess in the top of the securing-screw formed by the intersecting longitudinal and cross-grooves 12 and 14. The lower half $18^b$ is narrow enough to freely slide in the undercut 13 of the longitudinal groove 12, but still wide enough to be securely retained therein. When the locking-pin 17 is in place in the securing-screw, the cover 18 may be placed into its position by causing its lower portion $18^b$ to slip into the undercut 13 of the longitudinal groove 12 and its upper half $18^a$ being slightly less in width than that of the said longitudinal groove 12. The said cover may be slid along in the groove 12 until the projections 19 on the sides thereof come opposite to the depressions formed by the transverse groove 14 and are caused by the spring of the metal to be retracted therein, thus preventing the further longitudinal movement of the cover 18 by accident or until it may be desired to remove the same.

The modified form of securing-screw shown in Figs. 11 and 12 may be used in place of that just described and differs therefrom principally in the pin-retaining device with which it is equipped. The head of the said screw is grooved at one end for a portion of its length, as at 20, and in the line of the slot are drilled the holes 15 for the locking-pin 17. A strip of preferably spring metal 21 of length and width sufficient to extend over the pin-holes and to cover the same is pivoted to the said head by a pin or rivet 22, and such a degree of curvature is given the said strip that when the said strip coincides with the depression formed by the slot 20 it springs thereinto, and thus covering and retaining the pin until the cover 21 is intentionally removed from the slot and swung aside, as shown in the dotted lines, in order to allow the removal of the pin.

The heads of the securing-screws project from the surface of the tool at their entering points. The projection of the head of the lower securing-screw 8 is from the location of the same in the rear of the hammer-head and under the claw thereof comparatively unobjectionable; but the head of the upper securing-screw 9 projects from the side of the hammer-head and is very liable to injury from a glancing blow or from other causes incident to its use. I therefore provide a shield for its protection consisting of a tapering block 23, preferably integral with the tool-head, located upon its side between the securing-screw, and it is desired to protect the working surface or edge of the tool-head so as to prevent the injury of the said screw by causing the object which would otherwise injure said screw to pass harmlessly over the top of the same. For convenience in introducing or removing the pin-retaining cover 18 it is advisable to form the shield 23 with a longitudinal groove 24, passing along the length of the same and opposite the screw-head, having the bottom of the said groove approximately on a level with the undercut of the groove in the screw-head.

It is in many cases desirable to completely do away with the projecting securing-screwheads on the side of the tool, and in such cases I recommend the use of a modification of my method of securing the tool-heads to their handles. Figs. 13 to 22 show such modified method in use in securing a hatchet-head to its handle. In this form of construction, as in that described in the previous part of this specification, I secure the necessary hold of the handle within the tool socket or eye by the frictional contact caused by forcing the former against the interior surfaces of the latter; but I effect this result by a different arrangement of parts, as I will now describe.

In Fig. 13, 31 is the head of the tool to which the handle is to be secured, here represented as a hatchet-head. 32 shows the end of the handle in place. The eye 33 of the tool-head has substantially the same characteristics as that of the embodiment of my invention described in a previous part of this specification. The end of the handle is also made of a corresponding form to fit within the said eye. The handle end is prepared for the securing devices before it is introduced in place within the head-eye, when the securing devices clamp the same firmly in position in the manner which I will now describe. A bridge-piece 34 extends across the tool-eye 33 and is preferably dovetailed into the upper part of the metal tool, so as to be flush with the top of the same. However, said bridge-piece may be an integral part of the tool-head, if desired. The lower end of the handle is secured through the action of a wedging device constructed preferably of metal and consisting of a shank $35^a$, carrying on its lower extremity a wedge-block $35^b$. The handle is cut away, as shown in Figs. 20 and 15, for the shank $35^a$. A recess is also cut in the handle end of such a shape that the wedge-block $35^b$ fits therein. Both the recess in which the wedge-block fits and that prepared for the shank connecting therewith are of sufficient depth to cause the entire wedging device 35 to lie flush with the faces of the handle end, so as to permit the wedging device to be put in its place in the handle end before its insertion into the tool-eye. The shank $35^a$ is made with a threaded end $35^c$, provided with a nut 37. The threaded end portion 35ᶜ when the handle with the wedging device in place is inserted into the eye passes through a hole in the bridge-piece and is of length to extend above the said bridge-piece sufficiently to afford a hold for the nut 37. On screwing up the nut 37 the contact at 38 of the inclined surfaces of the wedge-block 35ᵇ and of the recess cut in the handle will cause the said block to bear against the end 33ᶜ of the tool-eye, and further screwing up of the nut 37 will crowd the handle securely against the opposite end 33ᵃ of the said eye and hold it firmly in position.
The bridge-piece 34, besides resisting the thrust caused by turning up the nut 37 on the threaded end 35ᶜ of the lower securing device, also serves as a bearing for the upper securing-screw 39, which is tapped through the same. The point of this screw is tapered, as shown in Figs. 22 and 14, and bears against the surface of a tapering recess 40, cut in the top of the handle end. After the lower securing device has been tightened, the screwing in of the upper securing-screws 39, bearing in the inclined and preferably metal protected surface 40ᵃ of the recess 40, wedges the upper end of the handle forcibly against the end of the head-eye, thus assisting the lower securing device in effecting the fastening of the tool-head to its handle. When necessary, shims or strips of metal 41 and 42 may be used under the point of the securing-screw 39 or between the inclined surfaces of the wedge-block 35ᵇ and the wood of the handle with which it contacts.

The holes through which the screwed end 35ᶜ of the shank 35ᵃ passes and that tapped for the securing-screw 39 are preferably located in close proximity to one another, and the nut 37, used on the former, I recommend making of substantially the form shown in Fig. 18 in order that the same may be prevented from turning by the screw 39 and may be further protected and covered by the head of the same. The head of the said securing-screw is preferably circular, as shown; but the form may be varied as desired. Thus the head may be formed with a beveled or a feather edge to improve the neatness of the appearance of the said screw or to obviate danger of injury to the screw-head by causing an accidental blow to glance over the same. Preferably also the said screw should be provided with a locking and pin-retaining device, as shown in Figs. 22 and 21, and embodying the same general features and details of construction as those described in a previous part of this specification and illustrated in Figs. 5, 6, and 7 or Figs. 11 and 12.

I claim as my invention—

1. The combination with a tool-head having an eye for the reception of a handle, and a handle received within the said eye, of a securing-screw fitted to a threaded hole in connection with the tool-head, and having a cone-shaped portion acting against a surface with which the said handle is provided, to wedge the handle and tool-head transversely with relation to each other and thereby secure them together, the said screw having a pocket for a locking-pin, and a locking-pin occupying the said pocket and engaging with the said tool-head to prevent undesired rotation of the screw.
2. The combination with a tool-head having an eye for the reception of a handle, and a handle received within the said eye, of a securing-screw fitted to a threaded hole in connection with the tool-head, and having a cone-shaped portion acting against a surface with which the said handle is provided, to wedge the handle and tool-head transversely with relation to each other and thereby secure them together, the said screw having a pocket for a locking-pin, a locking-pin occupying the said pocket and engaging with the said tool-head to prevent undesired rotation of the screw, and a movable shield whereby the said locking-pin is held from displacement.
3. The combination with a tool-head having an eye for the reception of a handle, and a handle received within the said eye and having a transversely beveled or inclined locking-surface at the outer portion of the said eye and a similar surface at the inner portion of the said eye, and separate adjustable tapering locking devices respectively engaging with the respective inclined surfaces of the handle, whereby the handle and tool-head are firmly connected together.

4. The combination with a tool-head having an eye, and a handle received within the said eye and having a beveled or inclined locking-surface at the outer portion of the said eye and a similar surface at the inner portion of the said eye, a movable locking device having a wedge engaging with one of the said inclined surfaces of the handle, and a screw fitted to a threaded hole in connection with the said tool-head and engaging by its free extremity with the other inclined surface of the handle, substantially as described.

5. The combination with a tool-head having an eye, and a handle received within the said eye and having a beveled or inclined locking-surface at the outer portion of the said eye and a similar surface at the inner portion of the said eye, a movable locking device having a wedge engaging with one of the said inclined surfaces of the handle, and screw fitted to a threaded hole in connection with the said tool-head and engaging by its free extremity with the other inclined surface of the handle, substantially as described.

6. The combination with a tool-head having an eye, and a handle received within the said eye and having a beveled or inclined locking-surface at the outer portion of the said eye and a reversely-inclined similar surface at the inner portion of the said eye, a movable locking device having a wedge engaging with one of the said inclined surfaces of the handle and a screw fitted to a threaded hole in connection with the said tool-head and engaging by its free extremity with the other inclined surface of the handle, the said locking device and screw respectively acting in opposite directions against the corresponding inclined locking-surfaces of the handle, substantially as described.

7. The combination with a tool-head having an eye, and a handle received within the said eye and having a beveled or inclined locking-surface at the outer portion of the said eye and a similar surface at the inner portion of the said eye, a movable locking device having a wedge engaging with one of the said inclined surfaces of the handle and a screw fitted to a threaded hole in connection with the said tool-head and engaging by its free extremity with the other inclined surface of the handle, and a locking device to hold the screw from rotation after being set or adjusted, substantially as described.

8. The combination with a tool-head having an eye, and a handle received within the said eye and having a beveled or inclined locking-surface at the outer portion of the said eye and a similar surface at the inner portion of the said eye, a movable locking device having a wedge engaging with one of the said inclined surfaces of the handle a screw fitted to a threaded hole in connection with the said tool-head and engaging by its free extremity with the other inclined surface of the handle, and a movable pin applied to the said screw to lock the same from rotation after being set or adjusted, substantially as described.

9. The combination with a tool-head having an eye, of a handle shaped to fit within the eye, and provided with a recess having an inclined face, and securing means in the said head comprising a screw having a conical point corresponding with and adapted to engage with the inclined face of the said recess for the purpose set forth, the head of the said screw being provided with an undercut slot in which the holes for the locking-pins are drilled, a pin-retaining device sliding therein, a slot crossing the undercut slot, and projections on the pin-retaining device fitting into the transverse slot whereby the accidental displacement of the pin-retaining device is prevented, substantially as described.

10. The combination with a tool-head having an eye, of a handle shaped to fit within the eye, and provided with a recess having an inclined face, and securing means in the said head comprising a screw having a conical point corresponding with and adapted to engage with the inclined face of the said recess for the purpose set forth, the head of the said screw being provided with a slot in which the holes for the locking-pins are drilled, a pin-retaining cover pivoted on the screw-head and adapted, when superimposed above the said slot, to be sprung into the same and to prevent the dislodgment of the pin, substantially as described.

11. A tool-head fitted with handle-securing devices comprising a headed screw, and provided with a shield to protect from injury the projecting head of the said screw, substantially as described.

12. The combination with a tool-head having an eye, of a handle fitted within the eye, a headed screw applied to the said tool-head to secure the handle in place, a locking-pin fitted to the head of said screw to hold the latter from accidental rotation, and a transversely-movable cover fitted to the head of the screw to hold said pin in place, the tool-head having a shield provided to receive the said cover.

13. In combination a tool-head having an eye to receive a handle, a handle fitted to the said eye and provided with inclined locking-surfaces at the inner and outer portions respectively of the said eye, a longitudinally-movable securing device having a wedge to act against the inner incline, and a screw-threaded outer extremity, a bridge-piece at the outer portion of said eye to which the screw-threaded extremity is fitted, a nut applied to the said extremity, and a securing-screw fitted to a hole tapped in the said bridge-piece and acting against the other inclined surface of the handle, the head of the said screw covering the said nut, substantially as described.

14. In combination a tool-head having an eye to receive a handle, a handle fitted to the said eye and provided with inclined locking-surfaces at the inner and outer portions respectively of the said eye, a longitudinally-movable securing device having a wedge to act against the inner incline, and a screw-threaded outer extremity, a bridge-piece at the outer portion of said eye to which the screw-threaded extremity is fitted, a nut applied to the said extremity, a securing-screw fitted to a hole tapped in the said bridge-piece and acting against the other inclined surface of the handle, the head of the said screw covering the said nut and a locking device to prevent the rotation of the said securing-screw, substantially as described.

In testimony whereof I affix my signature in presence of two witnesses.

MILTON F. POWERS.

Witnesses:
LEPINE HALL RICE,
WILLIAM A. COPELAND.